US008887289B1

(12) United States Patent
Hullale (10) Patent No.: US 8,887,289 B1
(45) Date of Patent: Nov. 11, 2014

(54) SYSTEMS AND METHODS FOR MONITORING INFORMATION SHARED VIA COMMUNICATION SERVICES

(75) Inventor: Sandip Hullale, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 394 days.

(21) Appl. No.: 13/043,439

(22) Filed: Mar. 8, 2011

(51) Int. Cl.
G06F 7/04 (2006.01)

(52) U.S. Cl.
USPC .................................. 726/26; 726/22; 726/25

(58) Field of Classification Search
None
See application file for complete search history.

(56) References Cited

U.S. PATENT DOCUMENTS

| | | | | |
|---|---|---|---|---|
| 6,374,145 | B1* | 4/2002 | Lignoul | 700/17 |
| 7,774,854 | B1* | 8/2010 | Watson et al. | 726/29 |
| 7,996,910 | B2* | 8/2011 | Toomey | 726/26 |
| 8,005,458 | B2* | 8/2011 | Baik et al. | 455/410 |
| 2004/0103147 | A1* | 5/2004 | Flesher et al. | 709/204 |
| 2004/0128552 | A1* | 7/2004 | Toomey | 713/201 |
| 2006/0048224 | A1* | 3/2006 | Duncan et al. | 726/22 |
| 2007/0101427 | A1* | 5/2007 | Toomey | 726/22 |
| 2008/0028069 | A1* | 1/2008 | Urbanek et al. | 709/224 |
| 2008/0077995 | A1* | 3/2008 | Curnyn | 726/27 |
| 2009/0106836 | A1* | 4/2009 | Toshima et al. | 726/22 |
| 2009/0106846 | A1* | 4/2009 | Dupray et al. | 726/26 |
| 2009/0254971 | A1* | 10/2009 | Herz et al. | 726/1 |
| 2009/0282241 | A1* | 11/2009 | Prafullchandra et al. | 713/156 |
| 2010/0319069 | A1* | 12/2010 | Granstedt et al. | 726/22 |
| 2010/0325726 | A1* | 12/2010 | Aoki et al. | 726/22 |
| 2011/0047628 | A1* | 2/2011 | Viars | 726/28 |
| 2011/0265148 | A1* | 10/2011 | Tam et al. | 726/4 |
| 2011/0277039 | A1* | 11/2011 | Harris et al. | 726/28 |
| 2011/0296531 | A1* | 12/2011 | Toomey | 726/26 |
| 2012/0096514 | A1* | 4/2012 | Tuscano et al. | 726/1 |
| 2012/0191518 | A1* | 7/2012 | Nix et al. | 705/14.17 |
| 2012/0210388 | A1* | 8/2012 | Kolishchak | 726/1 |
| 2012/0317635 | A1* | 12/2012 | Peled et al. | 726/11 |

* cited by examiner

*Primary Examiner* — Jeffrey Pwu
*Assistant Examiner* — Carlos Amorin
(74) *Attorney, Agent, or Firm* — ALG Intellectual Property, LLC (57) ABSTRACT

A computer-implemented method may include providing a security service capable of monitoring information shared by users of at least one communication service. The computer-implemented method may also include identifying a user of the communication service that has registered for the security service and maintaining a database that identifies potentially sensitive information. The computer-implemented method may further include determining, while monitoring information shared by the user via the communication service, that the user is attempting to share information that is potentially sensitive. In addition, the computer-implemented method may notify the user of the user's attempt to share potentially sensitive information via the communication service. Various other methods, systems, and computer-readable media are also disclosed.

16 Claims, 6 Drawing Sheets

SYSTEMS AND METHODS FOR MONITORING INFORMATION SHARED VIA COMMUNICATION SERVICES

BACKGROUND

In recent years, interpersonal interactions have been increasingly facilitated by a variety of communication technologies. For example, Internet users may interact with one another online by sharing information via an email service, a chat service, an instant messaging service, a social networking website, and/or a variety of other types of online communication services. During such interactions, people may intentionally or unintentionally share personal and/or sensitive information with one another.

In fact, during some types of interactions (e.g., interactions between users of an online social networking website), people may share personal and/or sensitive information with others whom they do not know very well. For example, a user of a social networking website may publish her physical address on her social networking profile to be seen by all other users that visit her social networking profile. Unfortunately, by mistakenly (or even intentionally) disclosing such personal and/or sensitive information to someone with malicious intentions (e.g., an identity thief), some people may fall victim to a social engineering or phishing attack. What is needed, therefore, is a mechanism that monitors information shared via communication services to notify users if they attempt to share potentially sensitive information.

SUMMARY

As will be described in greater detail below, the instant disclosure generally relates to systems and methods for monitoring information shared via communication services. In one embodiment, a method for monitoring information shared via communication services may include providing a security service capable of monitoring information shared by users of at least one communication service (such as a social networking website, an email service, a blog service, a chat service, an instant messaging service, a text messaging service, a multimedia messaging service, a phone service, or an in-person conversation). In one example, the security service may interface (or work in conjunction) with the communication service to monitor information that users of the communication service are attempting to share with one another.

In some embodiments, a provisioning module may identify a user of the communication service that has registered for the security service. In one example, the provisioning module may enable a user to register for the security service at any time via an interface (such as a webpage) associated the communication service. In another example, the provisioning module may receive, from the communication service, a communication that prompts the provisioning module to automatically register the user for the security service at the time the user registers for the communication service.

In some embodiments, the provisioning module may maintain a database that identifies potentially sensitive information (e.g., information that the user may want to avoid sharing via the communication service). Such potentially sensitive information may include information related to the user registered for the security service. In one example, the provisioning module may enable the user to identify private and/or sensitive information related to the user. For example, the user may enter information that the user considers private and/or sensitive (e.g., the user's address, social security number, health information, and financial account information) into an interface provided by the provisioning module.

Additionally or alternatively, such potentially sensitive information may identify one or more types of information that are generally considered private and/or sensitive (e.g., types of information that are typically obtained during a social engineering or phishing attack). For example, the provisioning module may provide generic formats indicative of information that is generally considered private and/or sensitive (e.g., a generic format of an address, social security number, date of birth, and/or phone number). The provisioning module may store such potentially sensitive information in the database to be compared at a later point in time with information that the user is attempting to share via the communication service.

In some embodiments, a monitoring module may monitor information shared by the user to determine whether the user is attempting to share potentially sensitive information. In one example, the monitoring module may detect an attempt by the user to share information via the communication service. In this example, the monitoring module may compare the information the user is attempting to share with the potentially sensitive information identified in the database. The monitoring module may then determine, based on the comparison, that the information the user is attempting to share is potentially sensitive.

In some embodiments, a notification module may notify the user of the user's attempt to share potentially sensitive information via the communication service. For example, the user may not realize that the information the user is attempting to share via the communication service is potentially sensitive. In this example, the notification module may notify the user that such information is potentially sensitive.

In one example, in response to the determination that information being shared is potentially sensitive, the notification module may automatically prevent the potentially sensitive information from being shared via the communication service. In another example, upon notifying the user of the user's attempt to share potentially sensitive information, the notification module may query the user to determine whether to prevent the potentially sensitive information from being shared via the communication service.

In some embodiments, the monitoring module may monitor information shared by the user via multiple communication services (e.g., multiple social networking websites). In such embodiments, the provisioning module may configure the user's privacy settings associated with the communication services to be consistent across all of the communication services. For example, the provisioning module may retrieve information about one or more additional users that maintain an association (such as an online friendship or relationship of trust) with the user registered for the security service. In this example, the provisioning module may then enable the user registered for the security service to assign each of the additional users to a particular level of access that defines which information is considered potentially sensitive across all of the communication services.

In some embodiments, the security service may also monitor various websites to determine whether any websites unrelated to the communication service are attempting to illegitimately distribute potentially sensitive information related to the user. For example, the monitoring module may identify potentially sensitive information related to the user in the database. In this example, the monitoring module may then identify and search through various websites to determine whether any websites are attempting to illegitimately distribute (or provide illegitimate access to) potentially sensitive information related to the user. If the monitoring module identifies at least one website that is attempting to illegitimately distribute potentially sensitive information related to the user, the notification module may notify the user of the website's attempt to illegitimately distribute such potentially sensitive information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for monitoring information shared via communication services. In one example, an online security service may interface (or work in conjunction with) a social networking website to monitor information that users of the social networking website are attempting to share with one another. For example, the social networking website may provide a webpage that enables users to register for the online security service. As part of the registration process, the online security service may collect information that the users consider private and/or sensitive.

The online security service may then monitor various activities of the registered users (such as online interactions involving the registered users) to prevent the registered users from falling victim to a social engineering or phishing attack. For example, the online security service may detect an attempt by a registered user to publish information on her profile associated with the social networking website. In this example, the online security service may compare the information the registered user is attempting to publish on her profile with the private and/or sensitive information collected by the online security service as part of the registration process.

The online security service may then determine, based on this comparison, that the information the registered user is attempting to publish on her profile is private and/or sensitive. In response to the determination that such information is private and/or sensitive, the online security service may notify the registered user of her attempt to publish private and/or sensitive information on her profile. In addition, the online security service may automatically prevent the private and/or sensitive information from being published on the registered user's profile or may query the registered user to determine whether to prevent the private and/or sensitive information from being published on the registered user's profile.

Figure 1:
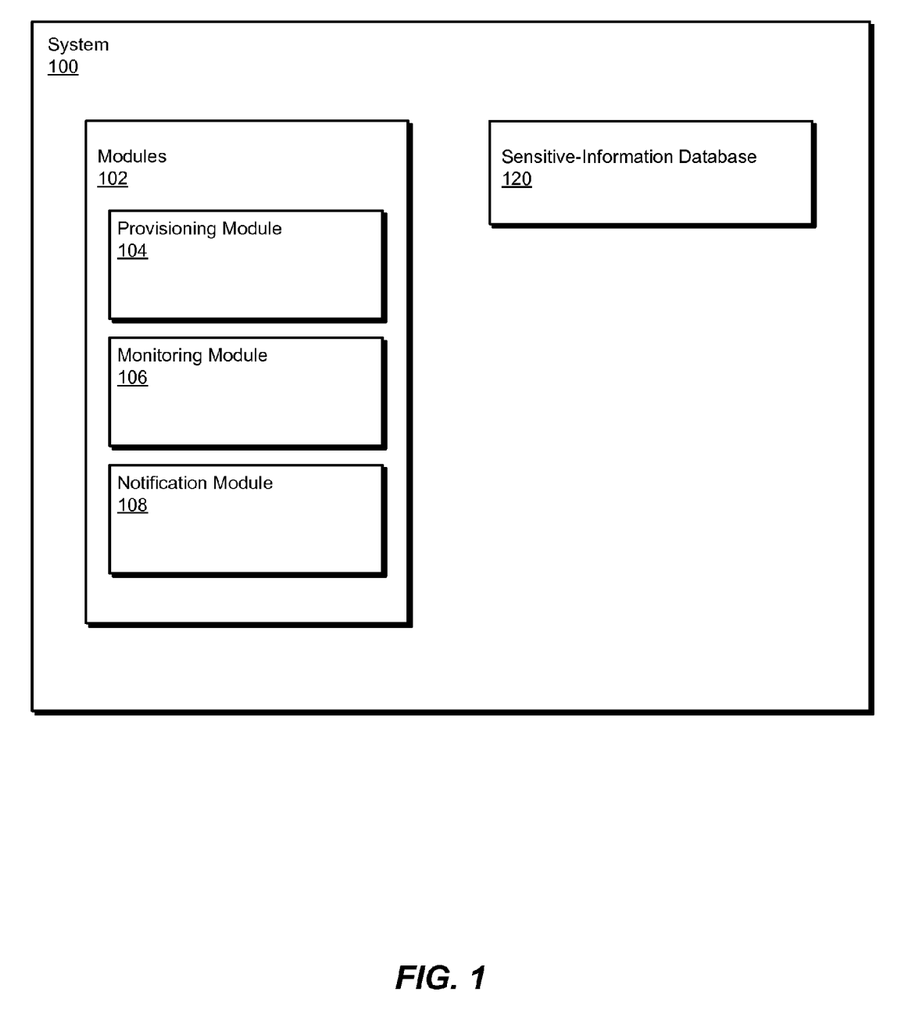
FIG. 1 is a block diagram of an exemplary system for monitoring information shared via communication services.
Figure 2:
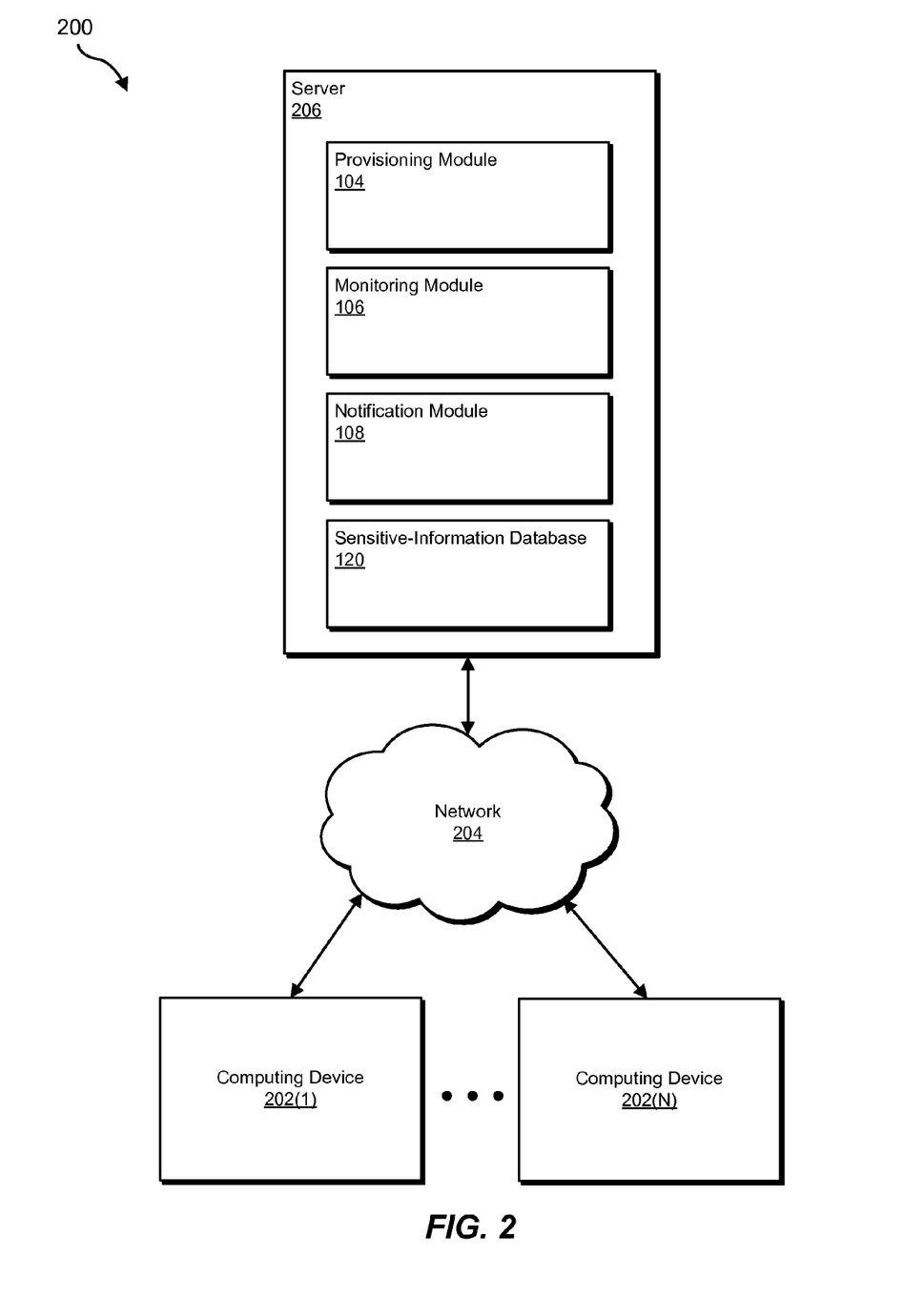
FIG. 2 is a block diagram of another exemplary system for monitoring information shared via communication services.

The following will provide, with reference to FIGS. 1-2, detailed descriptions of exemplary systems for monitoring information shared via communication services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for monitoring information shared via communication services. As illustrated in this figure, exemplary system 100 may include one or more modules 102 for performing one or more tasks. For example, and as will be explained in greater detail below, exemplary system 100 may include a provisioning module 104 programmed to identify a user of a communication service that has registered for a security service capable of monitoring information shared via the communication service. Provisioning module 104 may also be programmed to maintain a database that identifies potentially sensitive information (e.g., information that the user may want to avoid sharing via the communication service).

In addition, and as will be described in greater detail below, exemplary system 100 may include a monitoring module 106 programmed to monitor information shared by the user via the communication service to determine whether the user is attempting to share information that is potentially sensitive. Exemplary system 100 may also include notification module 108 programmed to notify the user of any attempts by the user to share information determined to be potentially sensitive. Although illustrated as separate elements, one or more of modules 102 in FIG. 1 may represent portions of a single module or application (such as a security service).

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one more databases. Such databases may represent portions of a single database or computing device or a plurality of databases or computing devices. In one embodiment, exemplary system 100 may include a sensitive-information database 120 configured to store potentially sensitive information (e.g., information that a user of a communication service may want to avoid sharing via the communication service). For example, sensitive-information database 120 may store information that a user of a communication service has identified as private and/or sensitive or types of information that are generally considered to be private and/or sensitive.

Database 120 in FIG. 1 may represent a portion of one or more computing devices. For example, database 120 may represent a portion of one or more of computing devices 202(1)-(N) in FIG. 2, server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include one or more computing devices 202(1)-(N) in communication with a server 206 via a network 204. In some embodiments, users of a communication service may use computing devices 202(1)-(N) to access the communication service via network 204. In such embodiments, server 206 may host a security service that interfaces with the communication service (or proxies traffic between the communication service and computing device 202(1)-(N)) to monitor information shared by the users via the communication service.

In one embodiment, and as will be described in greater detail below, server 206 may be programmed by one or more of modules 102 to provide a security service capable of monitoring information shared by users of at least one communication service (such as a social networking website, an email service, a chat service, an instant messaging service, a text messaging service, a multimedia messaging service, a phone service, and/or an in-person conversation). Server 206 may also be programmed by one or more of modules 102 to identify a user of the communication service that has registered for the security service and maintain a database that identifies potentially sensitive information (e.g., information that the user may want to avoid sharing via the communication service).

In addition, server 206 may also be programmed by one or more of modules 102 to monitor information shared by the user via the communication service to determine whether the user is attempting to share potentially sensitive information via the communication service. Server 206 may be further programmed by one or more of modules 102 to notify the user of any attempts by the user to share potentially sensitive information via the communication service.

Computing devices 202(1)-(N) generally represent any type or form of computing device capable of reading computer-executable instructions. In some embodiments, computing devices 202(1)-(N) may represent computing devices operated by users of the communication service. In such embodiments, at least one of computing devices 202(1)-(N) may represent a computing device operated by a user of the communication service that has registered for the security service capable of monitoring information shared via the communication service. Examples of computing devices 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other type of suitable computing device.

Server 206 generally represents any type or form of computing device capable of providing a security service that monitors information shared by users of a communication service. In some embodiments, server 206 may represent a computing device operated by a security software provider that interfaces (or works in conjunction with) the communication service. In other embodiments, server 206 may represent a portion of a computing device operated by the communication service that enables users to share information with one another. Examples of server 206 include, without limitation, application servers that run certain software applications, database servers that provide various database services, web servers that facilitate access to online content, combinations of one or more of the same, or any other type of suitable server.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM network or CDMA network), exemplary network architecture 600 in FIG. 6, or the like. Network 204 may facilitate communication or data transfer using wireless or wired connections. In one embodiment, network 204 may facilitate communication between computing devices 202(1)-(N) and server 206.

Although not illustrated in FIG. 2, system 200 may, in some embodiments, include at least one additional server that provides the communication service that enables users to share information with one another. This additional server may facilitate access by users of computing devices 202(1)-(N) to the communication service via network 204. For example, an additional server may host a social networking website that is accessible to users of computing devices 202(1)-(N) via network 204. In this example, server 206 may monitor information that users of computing device 202(1)-(N) are attempting to share with one another via the social networking website hosted by the additional server.

Figure 3:
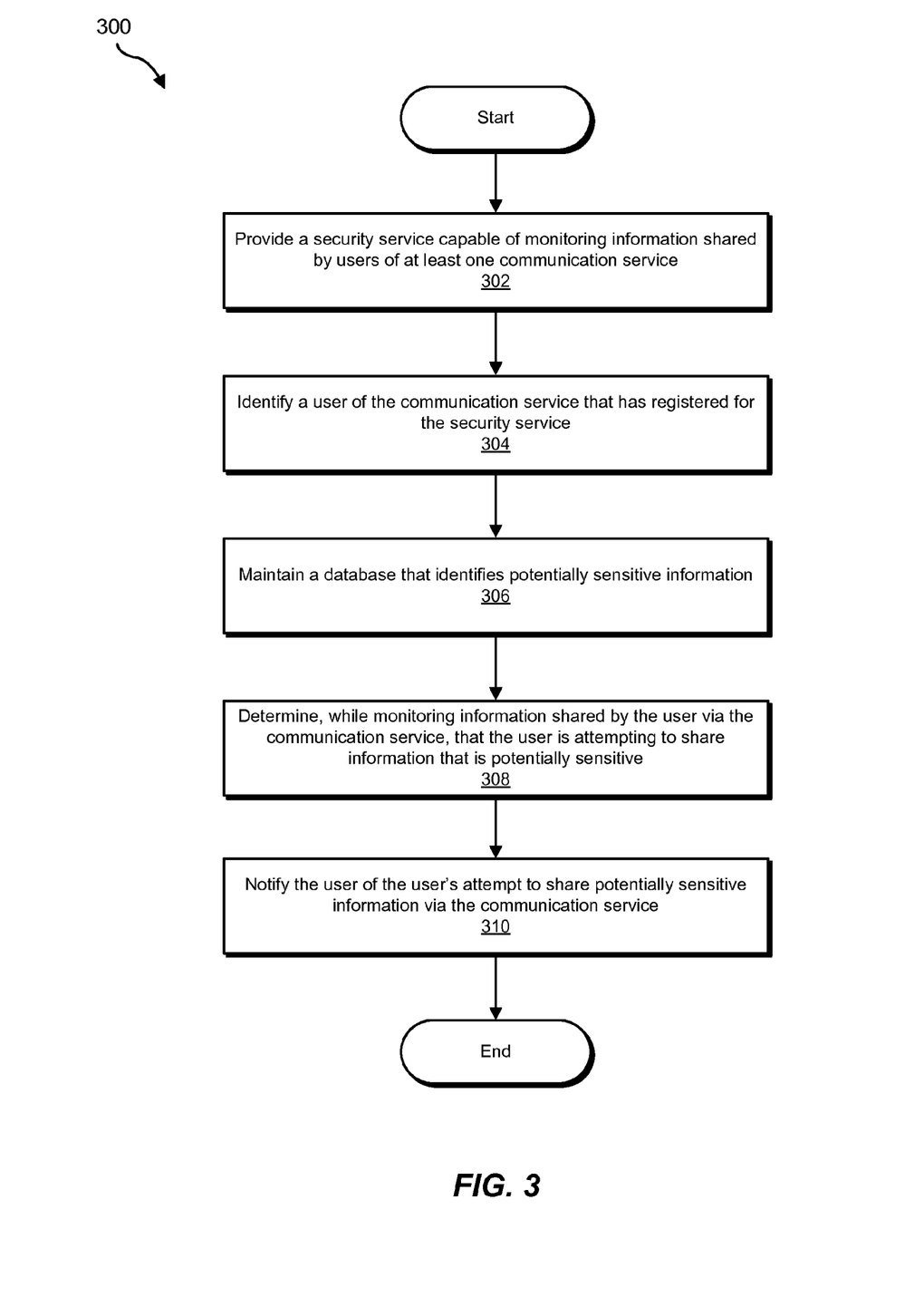
FIG. 3 is a flow diagram of an exemplary method for monitoring information shared via communication services.

FIG. 3 is a flow diagram of an exemplary computer-implemented method 300 for monitoring information shared via communication services. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated at step 302 in FIG. 3, the various systems described herein may provide a security service capable of monitoring information shared by users of at least one communication service. For example, modules 102 (i.e., provisioning module 104, monitoring module 106, and notification module 108) may, as part of server 206, provide a security service capable of monitoring information shared by one or more users of computing devices 202(1)-(N) via at least one communication service. The phrase "communication service," as used herein, generally refers to any type or form of system, application, or service that facilitates at least one aspect of communication between users.

Examples of such a communication service include, without limitation, a social networking website (such as FACEBOOK, MYSPACE, TWITTER, LINKEDIN, TAGGED, MYYEARBOOK, MEETUP, MYLIFE, MYHERITAGE, MULTIPLY, ORKUT, NING, CLASSMATES.COM, BEBO, FRIENDSTER, HI5, ORKUT, PERFSPOT, ZORPIA, NETLOG, or HABBO), an email service (such as GMAIL, HOTMAIL, YAHOO MAIL, or OUTLOOK), a blog service (such as BLOGGER), a chat service (such as CHATROULETTE), an instant messaging service (such as AOL INSTANT MESSENGER), a text messaging service (such as an SMS service), a multimedia messaging service (such as an MMS service), a phone service (such as VERIZON, AT&T, T-MOBILE, SPRINT, BOOST MOBILE, VONAGE, QWEST, or COMCAST), an in-person conversation, or any other type of suitable communication service.

The systems described herein may perform step 302 in a variety of ways. In one example, modules 102 may provide the security service by interfacing (or working in conjunction) with the communication service to monitor information that the users of computing devices 202(1)-(N) are attempting to share with one another via the communication service. In this example, one or more of modules 102 may intercept and analyze communications sent between computing devices 202(1)-(N) via the communication service to prevent the users of computing devices 202(1)-(N) from sharing potentially sensitive information.

In another example, modules 102 may provide the security service by independently monitoring and/or proxying traffic between computing devices 202(1)-(N) and the communication service without working in conjunction with the communication service. For example, server 206 may reside (with respect to the configuration of system 200) between computing devices 202(1)-(N) and the communication service. In this example, one or more of modules 102 installed on server 206 may monitor information the users are attempting to share with one another by intercepting and analyze communications from computing devices 202(1)-(N) before such communications reach the communication service. By monitoring information that the users of computing devices 202(1)-(N) are attempting to share with one another via the communication service, modules 102 may assist in preventing the users of computing devices 202(1)-(N) from falling victim to a social engineering or phishing attack.

As illustrated at step 304 in FIG. 3, the various systems described herein may identify a user of the communication service that has registered for the security service. For example, provisioning module 104 may, as part of server 206, identify a user of computing device 202(1) that has registered for the security service. In this example, provisioning module 104 may identify the user of computing device 202(1) at the time the user registers to have the security service monitor information shared by the user via the communication service.

The systems described herein may perform step 304 in a variety of ways. In one example, provisioning module 104 may enable the user of computing device 202(1) to register for the security service at any time via an interface (such as a webpage) associated with the communication service. For example, the communication service may provide an advertisement that indicates the security service is capable of monitoring information shared via the communication service. In this example, the advertisement may lead the user of computing device 202(1) to a webpage that enables the user to register to have the security service monitor information shared by the user via the communication service.

In another example, the communication service may provide an option to register for the security service as part of the registration process for the communication service. For example, while registering for the communication service, the user of computing device 202(1) may click on an option to automatically register for the security service at the same time. In this example, as the user of computing device 202(1) completes the registration process for the communication service, provisioning module 104 may receive a communication indicating that the user has requested to have the security service monitor information shared by the user via the communication service.

In a further example, the communication service may implement a default policy of automatically registering users for the security service as such users register for the communication service. For example, the communication service may automatically register the user of computing device 202(1) for the security service as the user registers for the communication service. In this example, as the user of computing device 202(1) completes the registration process for the communication service, provisioning module 104 may receive a communication requesting to have the security service monitor information shared by the user via the communication service. Provisioning module 104 may then register the user for the security service in response to receiving the communication from the communication service.

In an additional example, provisioning module 104 may enable the user of computing device 202(1) to register for the security service independent of the communication service. For example, provisioning module 104 may provide an interface (such as a webpage unrelated to the communication service) that enables the user of computing device 202(1) to register for the security service without any interaction with (or notice provided to) the communication service. In this example, the security service may be a third-party service that monitors the information shared by the user of computing device 202(1) via the communication service without the knowledge or approval of the communication service.

As illustrated at step 306 in FIG. 3, the various systems disclosed herein may maintain a database that identifies potentially sensitive information. For example, provisioning module 104 may, as part of server 206, maintain sensitive-information database 120, which stores potentially sensitive information. The phrase "potentially sensitive information," as used herein, generally refers to any type or form of information that may be considered private and/or sensitive in at least one context. The phrase "potentially sensitive information," as used herein, may also refer to any type or form of information capable of identifying information considered to be private and/or sensitive in at least one context.

In some embodiments, such potentially sensitive information may include information related to and/or specific to the user that has registered for the security service. Additionally or alternatively, such potentially sensitive information may identify one or more types of information that are generally considered private and/or sensitive (e.g., types of information that are typically obtained during a social engineering or phishing attack). Examples of such potentially sensitive information include, without limitation, identification information, address information, employment information, health information, financial account information, financial records, dates of birth, social security numbers, information capable of and/or used to identify any of the above-enumerated types of potentially sensitive information (e.g., generic formats indicative of such potentially sensitive information), or any other types of information that may be considered private and/or sensitive in at least one context.

The systems described herein may perform step 306 in a variety of ways. In one example, provisioning module 104 may create sensitive-information database 120 and populate sensitive-information database 120 with potentially sensitive information. In another example, provisioning module 104 may update an existing sensitive-information database 120 by replacing existing potentially sensitive information or adding new potentially sensitive information to sensitive-information database 120.

In one example, provisioning module 104 may enable the user to identify potentially sensitive information related to the user. For example, provisioning module 104 may provide access to a user interface (e.g., a webpage) configured to collect potentially sensitive information from the user of computing device 202(1). In this example, upon accessing the user interface, the user of computing device 202(1) may enter information that the user considers private and/or sensitive (e.g., the user's address, social security number, health information, date of birth, spouse's name, and financial account information) into the interface. Provisioning module 104 may then store the potentially sensitive information collected from the user of computing device 202(1) in sensitive-information database 120.

Figure 4:
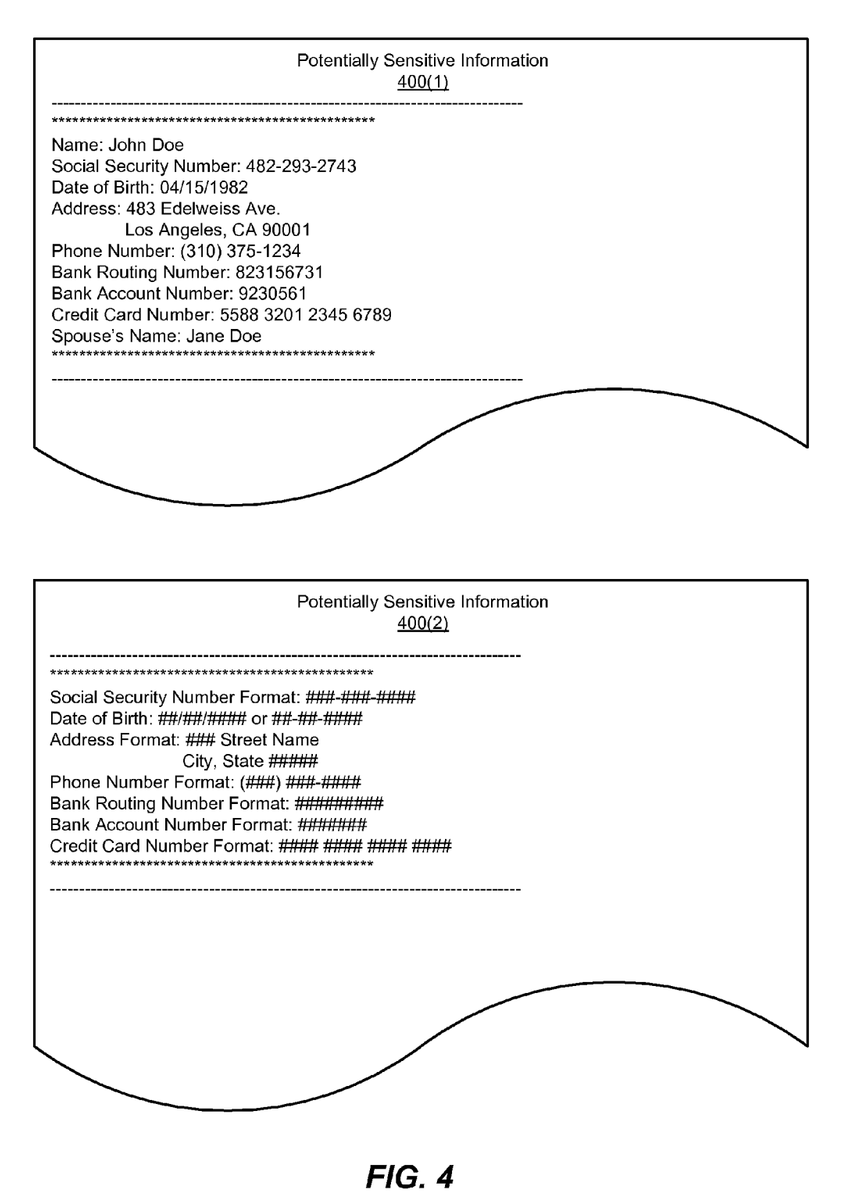
FIG. 4 is an illustration of exemplary potentially sensitive information related to a user and an illustration of exemplary potentially sensitive information that is generic.

As illustrated in FIG. 4, exemplary potentially sensitive information 400(1) may identify the user's name (in this example, "John Doe"), the user's social security number (in this example, "482-293-2743"), the user's date of birth (in this example, "04/15/1982"), the user's address (in this example, "483 Edelweiss Ave., Los Angeles, Calif. 90001"), the user's phone number (in this example, "(310) 375-1234"), the user's bank routing number (in this example, "823156731"), the user's bank account number (in this example, "9230561"), the user's credit card number (in this example, "5588 3201 2345 6789"), and the name of the user's spouse (in this example, "Jane Doe").

In another example, provisioning module 104 may provide one or more generic formats and/or templates indicative of information that is generally considered to be potentially sensitive (e.g., a generic format or template of an address, social security number, date of birth, and/or phone number). For example, provisioning module 104 may be pre-programmed to provide default generic formats and/or templates of information generally considered to be private and/or sensitive. Additionally or alternatively, provisioning module 104 may obtain generic formats and/or templates indicative of information generally considered to be private and/or sensitive from a database associated with the security service. Such generic formats and/or templates may represent information that is generally used in a social engineering or phishing attack. Provisioning module 104 may store such generic formats and/or templates in sensitive-information database 120.

As illustrated in FIG. 4, exemplary potentially sensitive information 400(2) may include a generic format of a social security number (in this example, "###-###-####"), generic formats of a date of birth (in this example, "##/##/#### or ##-##-####"), a generic format of an address (in this example, "### Street Name, City, State #####"), a generic format of a phone number (in this example, "(###) ###-####"), a generic format of a bank routing number (in this example, "#########"), a generic format of a bank account number (in this example, "#######"), and a generic format of a credit card number (in this example, "#### #### #### ####"). In these examples, the character "#" may represent any number or numerical character (e.g., 0, 1, 2, 3, 4, 5, 6, 7, 8, or 9) included in a text string of alphanumerical characters.

As illustrated at step 308 in FIG. 3, the various systems described herein may monitor information shared by the user via the communication service. For example, monitoring module 106 may, as part of server 206, monitor information shared by the user of computing device 202(1) via the communication service. In one example, monitoring module 106 may monitor information that the user of computing device 202(1) (who has registered for the security service) is attempting to share with the user of computing device 202(N) via the communication service.

The systems described herein may perform step 308 in a variety of ways. In one example, monitoring module 106 may detect an attempt by the user of computing device 202(1) to share information via the communication service. For example, monitoring module 106 may intercept a communication that is directed to the communication service. Monitoring module 106 may then analyze the communication and determine, before the communication reaches the communication service, that the communication includes information that the user of computing device 202(1) is attempting to share with the user of computing device 202(N) via the communication service.

In another example, monitoring module 106 may receive a communication that was relayed from the communication service to server 206. In this example, the communication service may have relayed the communication to server 206 to have monitoring module 106 analyze whether the communication includes information (e.g., potentially sensitive information) that the user is attempting to share via the communication service. Monitoring module 106 may then analyze the communication and determine, based on this analysis, that the communication includes information that the user of computing device 202(1) is attempting to share with the user of computing device 202(N) via the communication service.

Although not illustrated in FIG. 2, in some embodiments, monitoring module 106 may represent a security service client that monitors information the user is attempting to share via the communication service. For example, monitoring module 106 may function as a security service client installed on computing device 202(1). In this example, while functioning as a security service client installed on computing device 202(1), monitoring module 106 may intercept a communication directed (at least intermediately) to the communication service. Monitoring module 106 may then analyze the communication and determine, before the communication is actually sent to the communication service, that the communication includes information that the user of computing device 202(1) is attempting to share with the user of computing device 202(N) via the communication service.

In other embodiments not illustrated in FIG. 2, monitoring module 106 may be installed on at least one of a variety of additional network components and/or devices (including, e.g., a network interface controller, a network router, a network gateway). For example, monitoring module 106 may be installed on a network gateway that serves as an access point to the communication service. In this example, while installed on the network gateway, monitoring module 106 may intercept a communication from computing device 202(1) that is directed (at least intermediately) to the communication service. Monitoring module 106 may then analyze the communication and determine, before the communication reaches to the communication service, that the communication includes information that the user of computing device 202(1) is attempting to share with the user of computing device 202(N) via the communication service.

Upon detecting the user's attempt to share information via the communication service, monitoring module 106 may compare the information with the potentially sensitive information identified in sensitive-information database 120. Monitoring module 106 may then determine, based on this comparison, that the information the user of computing device 202(1) is attempting to share with the user of computing device 202(N) is potentially sensitive.

The user of computing device 202(1) may attempt to share information via the communication service in a variety of ways. Examples of the ways that the user of computing device 202(1) may attempt to share information via the communication service include, without limitation, publishing information on a webpage associated with the communication service (such as a blog, user profile, or message wall), sending information in an email, instant message, text message, or multimedia message via the communication service, disclosing information in a phone call via the communication service, disclosing information during an in-person conversion that the communication service is analyzing, or any suitable way that the user of computing device 202(1) may attempt to share information via the communication service.

In one example, if the communication service provides profiles to users (e.g., if the communication service is a social networking website), monitoring module 106 may detect an attempt by the user of computing device 202(1) to publish information on the user's own profile. In this example, before the information has been published on the user's profile, monitoring module 106 may compare the information that the user of computing device 202(1) is attempting to publish on the user's profile with the potentially sensitive information identified in sensitive-information database 120. For example, monitoring module 106 may determine that the information that he user is attempting to publish includes text string "482-293-2743."

In an effort to determine whether text string "482-293-2743" is potentially sensitive, monitoring module 106 may locate potentially sensitive information 400(1) in sensitive-information database 120 and compare text string "482-293-2743" with potentially sensitive information 400(1). Upon comparing text string "482-293-2743" with potentially sensitive information 400(1), monitoring module 106 may determine that text string "482-293-2743" is also included in potentially sensitive information 400(1). Monitoring module 106 may then determine, based on this comparison, that potentially sensitive information 400(1) identifies text string "482-293-2743" as being potentially sensitive.

Additionally or alternatively, monitoring module 106 may locate potentially sensitive information 400(2) in sensitive-information database 120 and compare text string "482-293-2743" with potentially sensitive information 400(2). Upon comparing the text string "482-293-2743" with potentially sensitive information 400(1), monitoring module 106 may identify generic format "###-###-####" in potentially sensitive information 400(2). Monitoring module 106 may then determine that text string "482-293-2743" corresponds to generic format "###-###-####" since the numerical characters and dashes identified in both the text string and the generic format indicate a match. As a result of this comparison, monitoring module 106 may determine that potentially sensitive information 400(2) indicates that text string "482-293-2743" is potentially sensitive.

As illustrated at step 310 in FIG. 3, the various systems described herein may notify the user of the user's attempt to share potentially sensitive information via the communication service. The systems described herein may perform step 310 in a variety of ways. For example, notification module 108 may, as part of server 206, notify the user of computing device 202(1) of the user's own attempt to share potentially sensitive information via the communication service. In this example, the user's attempt to share potentially sensitive information may be a conscious or subconscious attempt by the user to share such information. As such, in some embodiments, the user may be aware of the attempt to share certain information but unaware that such information is potentially sensitive.

In some examples, notification module 108 may send, to the user of computing device 202(1), a notification that identifies the potentially sensitive information that the user was attempting to share via the communication service. For example, notification module 108 may send a notification indicating to the user of computing device 202(1) that the user was attempting to publish text string "482-293-2743" via the communication service. In this example, the notification may further indicate that text string "482-293-2743" appears to be a social security number, which is potentially sensitive information.

Notification module 108 may notify the user of computing device 202(1) in a variety of ways. Examples of the ways that notification module 108 may notify the user include, without limitation, sending a notification to the user in an email, instant message, text message, multimedia message, chat message, phone message, and/or notifying the user via any other suitable mechanism. Upon completion of step 310, exemplary method 300 in FIG. 3 may terminate.

Although not illustrated in FIG. 3, an exemplary method for monitoring information shared via communication services may include one or more additional steps. In one embodiment, monitoring module 106 may automatically prevent the user's attempt to share the potentially sensitive information. For example, in response to determining that the information that the user of computing device 202(1) is attempting to publish includes text string "482-293-2743," monitoring module 106 may prevent the information from being published via the communication service. In another example, monitoring module 106 may simply remove text string "482-293-2743" from the information prior to allowing the information to be published via the communication service.

In another embodiment, notification module 108 may query the user to determine whether to prevent the potentially sensitive information from being shared via the communication service. For example, upon notifying the user of the user's attempt to publish text string "482-293-2743" via the communication service, notification module 108 may query the user to determine whether to prevent or allow the potentially sensitive information to be shared via the communication service. In this example, if the user indicates that text string "482-293-2743" is not to be published, monitoring module 106 may prevent the potentially sensitive information from being published. However, if the user indicates that text string "482-293-2743" is to be published, monitoring module 106 may allow the potentially sensitive information to be published.

In some examples, certain information may be considered potentially sensitive only with respect to particular users of the communication service. For example, provisioning module 104 may enable the user of computing device 202(1) to identify certain information that is considered potentially sensitive with respect to the user of computing device 202(N). In this example, provisioning module 104 may then store this information that is considered potentially sensitive with respect to the user in sensitive-information database 120.

Although this information is considered potentially sensitive with respect to the user of computing device 202(N), the same information may not be considered potentially sensitive with respect to one or more additional users of the communication service. For example, the user of computing device 202(1) may indicate that the user's date of birth is potentially sensitive only with respect to the user of computing device 202(N). In this example, if the user of computing device 202(1) attempts to share the user's date of birth with the user of computing device 202(N), notification module 108 may notify the user of the user's attempt to share potentially sensitive information via the communication service. However, if the user of computing device 202(1) attempts to share the user's date of birth with one or more additional users of the communication service, notification module 108 may not notify the user since the user's date of birth is not considered potentially sensitive.

In some examples, the user of computing device 202(1) may classify the user of computing device 202(N) by identifying the user as a member of a particular class or group (e.g., a family member, friend, co-worker, acquaintance, or stranger). Each class or group may correspond to a different threshold for determining whether the information the user of computing device 202(1) is attempting to share is considered potentially sensitive. In other words, the information may be considered potentially sensitive with respect to members of one class or group but not considered potentially sensitive with respect to members of another class or group.

In some examples, monitoring module 106 may monitor information shared by the user via multiple communication services (e.g., multiple social networking websites). In such examples, provisioning module 104 may configure the user's privacy settings associated with the communication services to be consistent across all of the communication services. For example, provisioning module 104 may retrieve, from the communication service, information that identifies one or more associations (such as friendships or relationships of trust) between the user of computing device 202(1) and one or more additional users of the communication service (including, e.g., the user of computing device 202(N)). In this example, provisioning module 104 may then enable the user of computing device 202(1) to assign each of the additional users to a particular level of access that defines which information is considered potentially sensitive across all of the communication services monitored by monitoring module 106.

In one example, if monitoring module 106 is monitoring information shared by the user via multiple communication services, monitoring module 106 may prevent information that is considered potentially sensitive from being shared via any of the communication services monitored by monitoring module 106. For example, the user of computing device 202(1) may assign the user of computing device 202(N) to a level of access that classifies the phone number of the user of computing device 202(1) as potentially sensitive. In this example, if the user of computing device 202(1) attempts to share the user's phone number with the user of computing device 202(N) via any of the communication services, monitoring module 106 may prevent the user's phone number from being shared.

In some examples, if the communication service provides profiles to users (e.g., if the communication service is a social networking website), monitoring module 106 may monitor the activity on the profile of the user of computing device 202(1). For example, monitoring module 106 may identify the profile of the user of computing device 202(1) and then detect one or more attempts by one or more additional users to view or visit the user's profile via the communication service. In this example, monitoring module 106 may also generate audience statistics that identify information related to the additional users' attempts to view or visit the user's profile via the communication service. Notification module 108 may then present such audience statistics to the user of computing device 202(1) on a periodic basis or enable the user of computing device 202(1) to access such audience statistics at any time.

Examples of the types of information that may be identified in such audience statistics include, without limitation, information that identifies the additional users that attempted to view or visit the user's profile, information that identifies at least one portion of the user's profile that the additional users attempted to view or visit, information that identifies the number of times that the additional users have attempted to view or visit the user's profile, information that identifies at least one risk associated with the additional users' attempts to view or visit the user's profile, information that identifies a particular level of access to which each of the additional users that attempted to view or visit the user's profile has been assigned, information that identifies a class or group (e.g., a family member, friend, co-worker, acquaintance, or stranger) to which each of the additional users belongs, or any other relevant types of information.

In addition, if the communication service provides profiles to users (e.g., if the communication service is a social networking website), the security service may prevent users of the communication service from accessing (e.g., visiting or viewing) potentially sensitive information published on additional users' profiles. For example, a social networking website may provide a profile to the user of computing device 202(1). In this example, the user of computing device 202(N) may attempt to access the profile of the user of computing device 202(1). If the profile includes information that is potentially sensitive with respect to at least the user of computing device 202(N), monitoring module 106 (or an additional module included in the security service) may prevent the user of computing device 202(N) from accessing at least those portions of the profile that include potentially sensitive information.

In some examples, monitoring module 106 may also monitor various websites to determine whether any websites unrelated to the communication service are attempting to illegitimately distribute potentially sensitive information related to the user of computing device 202(1). For example, monitoring module 106 may identify potentially sensitive information related to the user of computing device 202(1) in sensitive-information database 120. Monitoring module 106 may then identify and search through one or more websites to determine whether any websites are attempting to illegitimately distribute (or provide illegitimate access to) any potentially sensitive information related to the user of computing device 202(1). After monitoring module 106 has identified at least one website that is attempting to illegitimately distribute potentially sensitive information related to the user of computing device 202(1), notification module 108 may notify the user of the website's attempt to illegitimately distribute such potentially sensitive information.

Figure 5:
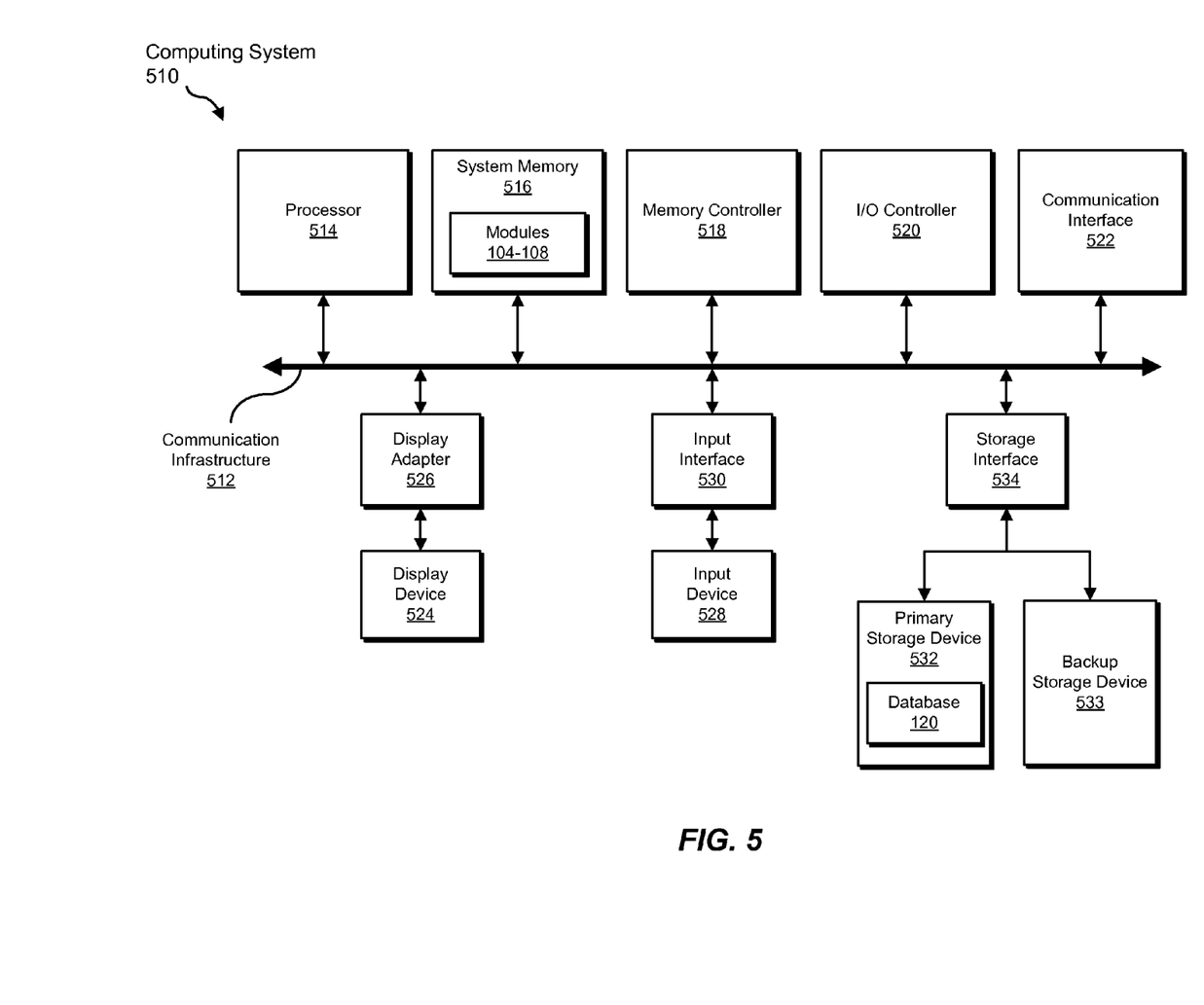
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, modules 104-108 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, providing, detecting, monitoring, comparing, determining, notifying, enabling, registering, maintaining, storing, preventing, querying, retrieving, generating, and presenting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
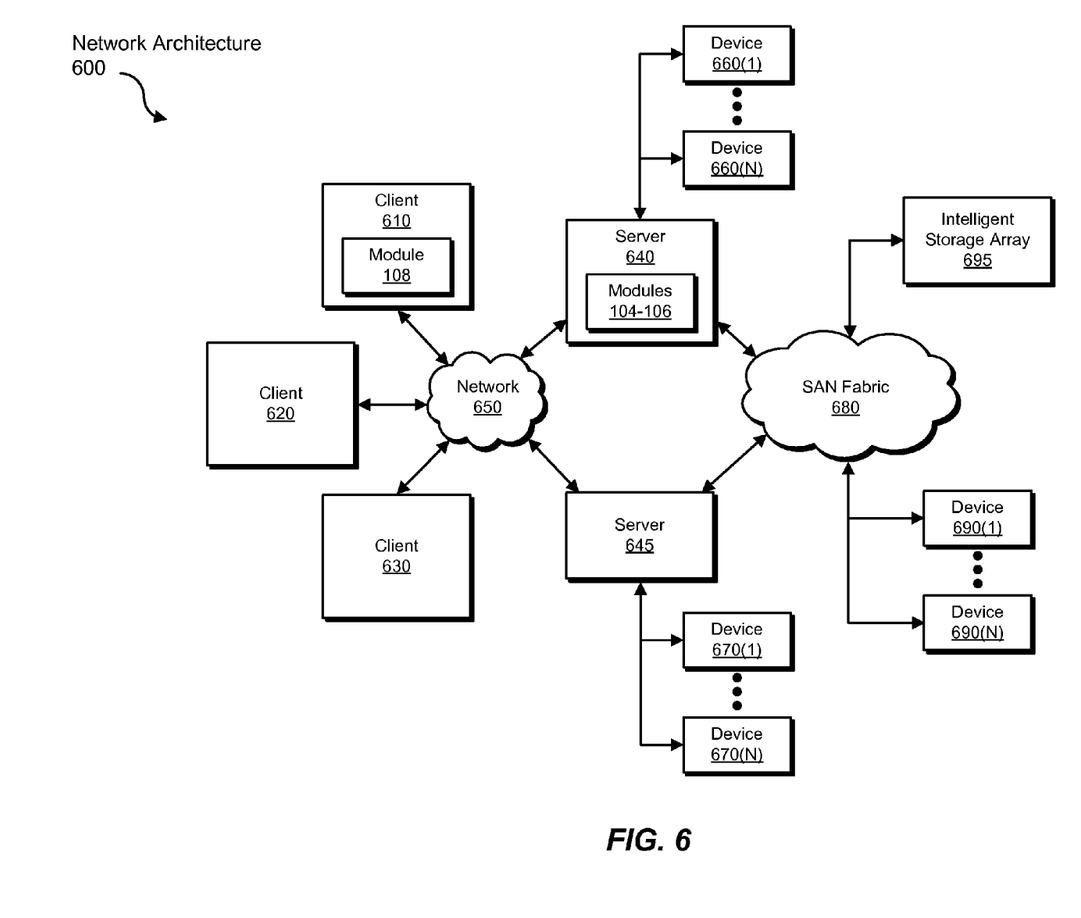
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include one or more elements of system 100 from FIG. 1. For example, as shown in FIG. 6, client system 610 may be programmed with module 108 and server 640 may be programmed with modules 104-106.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, providing, detecting, monitoring, comparing, determining, notifying, enabling, registering, maintaining, storing, preventing, querying, retrieving, generating, and presenting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for monitoring information shared via communication services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as computing device 202(1) in FIG. 2) by notifying a user of an attempt by the user to share potentially sensitive information via a communication service.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for monitoring information shared via communication services, at least a portion of the method being performed by a computing device comprising at least one processor, the method comprising:

providing, by the computing device, a security service capable of monitoring information shared via a plurality of communication services, wherein the security service is independent of the plurality of communication services;

identifying, by the computing device, a user of the plurality of communication services that has registered for the security service;

maintaining, by the computing device, a database that identifies potentially sensitive information associated with the user by:

retrieving information that identifies an association between the user and an additional user;

enabling the user to identify information that is considered potentially sensitive with respect to the additional user across the plurality of communication services such that the user is unable to share the information that is considered potentially sensitive with the additional user via any of the plurality of communication services;

storing the information that is considered potentially sensitive with respect to the additional user in the database to facilitate determining whether the user is attempting to share the information that is considered potentially sensitive with the additional user via any of the plurality of communication services;

monitoring, by the computing device, information shared by the user via at least one of the plurality of communication services by:

identifying a profile of the user provided by the at least one of the plurality of communication services;

detecting an attempt by the additional user to access the user's profile via the at least one of the plurality of communication services;

comparing information shared by the user via the user's profile with the potentially sensitive information identified in the database;

determining, based on the comparison, that at least a portion of the information shared by the user via the user's profile is considered potentially sensitive with respect to the additional user;

preventing, by the computing device, the additional user from accessing the portion of information that is considered potentially sensitive with respect to the additional user via the user's profile.

2. The computer-implemented method of claim 1, wherein providing the security service comprises providing a security service capable of monitoring information shared via at least one of:
- a social networking website;
- an email service;
- a blog service;
- a chat service;
- an instant messaging service;
- a text messaging service;
- a multimedia messaging service;
- a phone service;
- an in-person conversation.

3. The computer-implemented method of claim 1, wherein identifying the user that has registered for the security service comprises at least one of:
- enabling the user to register for the security service via the at least one of the plurality of communication services;
- automatically registering the user for the security service as the user registers for the at least one of the plurality of communication services.

4. The computer-implemented method of claim 1, wherein maintaining the database that identifies the potentially sensitive information comprises maintaining a database that identifies information that has been classified as potentially sensitive by the user of the plurality of communication services.

5. The computer-implemented method of claim 1, wherein maintaining the database that identifies the potentially sensitive information comprises maintaining a database that identifies one or more types of information generally considered to be potentially sensitive.

6. The computer-implemented method of claim 1, further comprising:
notifying the user of the additional user's attempt to access the user's profile via the at least one of the plurality of communication services.

7. The computer-implemented method of claim 1, wherein enabling the user to identify the information that is considered potentially sensitive with respect to the additional user comprises enabling the user to assign the additional user to a particular level of access that defines which information is considered potentially sensitive with respect to the additional user.

8. The computer-implemented method of claim 7, wherein determining that the portion of the information shared by the user via the user's profile is considered potentially sensitive with respect to the additional user comprises:
determining, based on the particular level of access assigned to the additional user, which information shared by the user via the user's profile is considered potentially sensitive with respect to the additional user.

9. The computer-implemented method of claim 1, wherein monitoring the information shared by the user via the at least one of the plurality of communication services comprises:
generating audience statistics that identify information related to the additional user's attempt to access the user's profile via the at least one of the plurality of communication services;
presenting the audience statistics to the user.

10. The computer-implemented method of claim 9, wherein the audience statistics comprise at least one of:
information that identifies the additional user that attempted to access the user's profile;
information that identifies at least one particular portion of the user's profile that the additional user attempted to access;
information that identifies the number of times that the additional user has attempted to access the user's profile;
information that identifies at least one risk associated with the additional user's attempt to access the user's profile;
information that identifies a particular level of access to which the additional user that attempted to access the user's profile has been assigned;
information that identifies a class or group to which the additional user that attempted to access the user's profile belongs.

11. The computer-implemented method of claim 1, further comprising:
identifying, in the database that identifies potentially sensitive information, potentially sensitive information that is related to the user;
identifying at least one website that is unrelated to the at least one of the plurality of communication services;
determining that the website is attempting to illegitimately distribute the potentially sensitive information related to the user;
notifying the user of the website's attempt to illegitimately distribute the potentially sensitive information related to the user.

12. The computer-implemented method of claim 1, wherein enabling the user to identify the information that is considered potentially sensitive with respect to the additional user comprises enabling the user to assign the additional user to a particular level of access that defines which types of information are considered potentially sensitive with respect to the additional user such that the user is notified upon attempting to share information of the types considered potentially sensitive with the additional user via any of the plurality of communication services.

13. A system for monitoring information shared via communication services, the system comprising:
at least one processor;
a provisioning module programmed to direct the processor to:
provide a security service capable of monitoring information shared via a plurality of communication services, wherein the security service is independent of the plurality of communication services;
identify a user of the plurality of communication services that has registered for the security service;
maintain a database that identifies potentially sensitive information associated with the user by:
retrieving information that identifies an association between the user and an additional user;
enabling the user to identify information that is considered potentially sensitive with respect to the additional user across the plurality of communication services such that the user is unable to share the information that is considered potentially sensitive with the additional user via any of the plurality of communication services;

storing the information that is considered potentially sensitive with respect to the additional user in the database to facilitate determining whether the user is attempting to share the information that is considered potentially sensitive with the additional user via any of the plurality of communication services;

a monitoring module programmed to direct the processor to:

monitor information shared by the user via at least one of the plurality of communication services by:

identifying a profile of the user provided by the at least one of the plurality of communication services;

detecting an attempt by the additional user to access the user's profile via the at least one of the plurality of communication services;

comparing information shared by the user via the user's profile with the potentially sensitive information identified in the database;

determining, based on the comparison, that at least a portion of the information shared by the user via the user's profile is considered potentially sensitive with respect to the additional user;

prevent the additional user from accessing the portion of information that is considered potentially sensitive with respect to the additional user via the user's profile.

14. The system of claim 13, wherein the provisioning module is programmed to direct the processor to maintain a database that identifies information that has been classified as potentially sensitive by the user of the at least one of the plurality of communication services.

15. The system of claim 13, wherein the provisioning module is programmed to direct the processor to maintain a database that identifies one or more types of information capable of being used in a social engineering attack or a phishing attack.

16. A non-transitory computer-readable-storage medium comprising computer-readable instructions that, when executed by at least one processor of a computing device, cause the computing device to:

provide a security service capable of monitoring information shared via a plurality of communication services, wherein the security service is independent of the plurality of communication services;

identify a user of the plurality of communication services that has registered for the security service;

maintain a database that identifies potentially sensitive information associated with the user by:

retrieving information that identifies an association between the user and an additional user;

enabling the user to identify information that is considered potentially sensitive with respect to the additional user across the plurality of communication services such that the user is unable to share the information that is considered potentially sensitive with the additional user via any of the plurality of communication services;

storing the information that is considered potentially sensitive with respect to the additional user in the database to facilitate determining whether the user is attempting to share the information that is considered potentially sensitive with the additional user via any of the plurality of communication services;

monitor information shared by the user via at least one of the plurality of communication services by:

identifying a profile of the user provided by the at least one of the plurality of communication services;

detecting an attempt by the additional user to access the user's profile via the at least one of the plurality of communication services;

comparing information shared by the user via the user's profile with the potentially sensitive information identified in the database;

determining, based on the comparison, that at least a portion of the information shared by the user via the user's profile is considered potentially sensitive with respect to the additional user;

prevent the additional user from accessing the portion of information that is potentially sensitive with respect to the additional user via the user's profile.

* * * * *